Jan. 1, 1935. R. M. HARDGROVE 1,986,664
FURNACE
Filed Aug. 13, 1930 3 Sheets-Sheet 2

INVENTOR
Ralph M. Hardgrove
BY
Gifford Scull & Burgess
ATTORNEY

Jan. 1, 1935.    R. M. HARDGROVE    1,986,664
FURNACE
Filed Aug. 13, 1930    3 Sheets-Sheet 3

Patented Jan. 1, 1935

1,986,664

UNITED STATES PATENT OFFICE 1,986,664

FURNACE

Ralph M. Hardgrove, Bethlehem, Pa., assignor to Fuller Lehigh Company, Fullerton, Pa., a corporation of Delaware Application August 13, 1930, Serial No. 475,009

12 Claims. (Cl. 122—235)

This invention relates to furnaces that are provided with openings through the walls of the furnace for withdrawing molten slag that collects upon the floor of the furnace from hot products of combustion in the furnace. This invention is especially useful in connection with furnaces in which powdered fuel is burned and the floor of the furnace is inclined so that the molten slag will collect in such a way that its greatest depth is near the slag tapping opening and decreases to a thin section or feather edge along one or more edges of the slag.

Hitherto in furnaces that are provided with slag tapping openings for withdrawing molten slag, the layer of slag is sometimes permitted to cool in the furnace with its edges in contact with the walls of the furnace so that subsequent expansion due to heating the slag again displaces the walls of the furnace. By the present invention the water cooled floor of the furnace is inclined so that one or more edges of the slag becomes sufficiently thin in order that it may fail under compression due to expansion before excessive strain is exerted upon the furnace walls.

Figure 1:
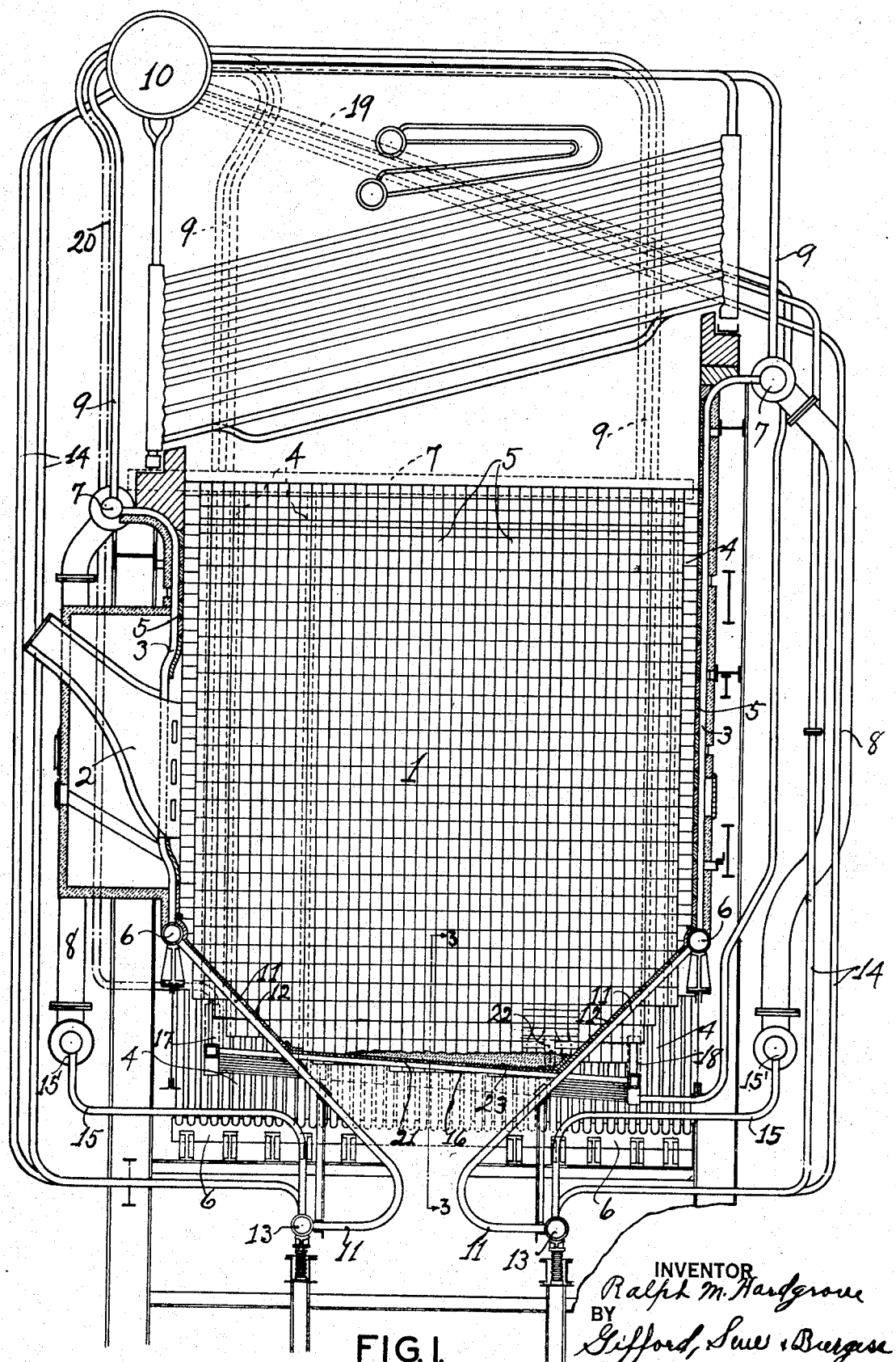
Figure 2:
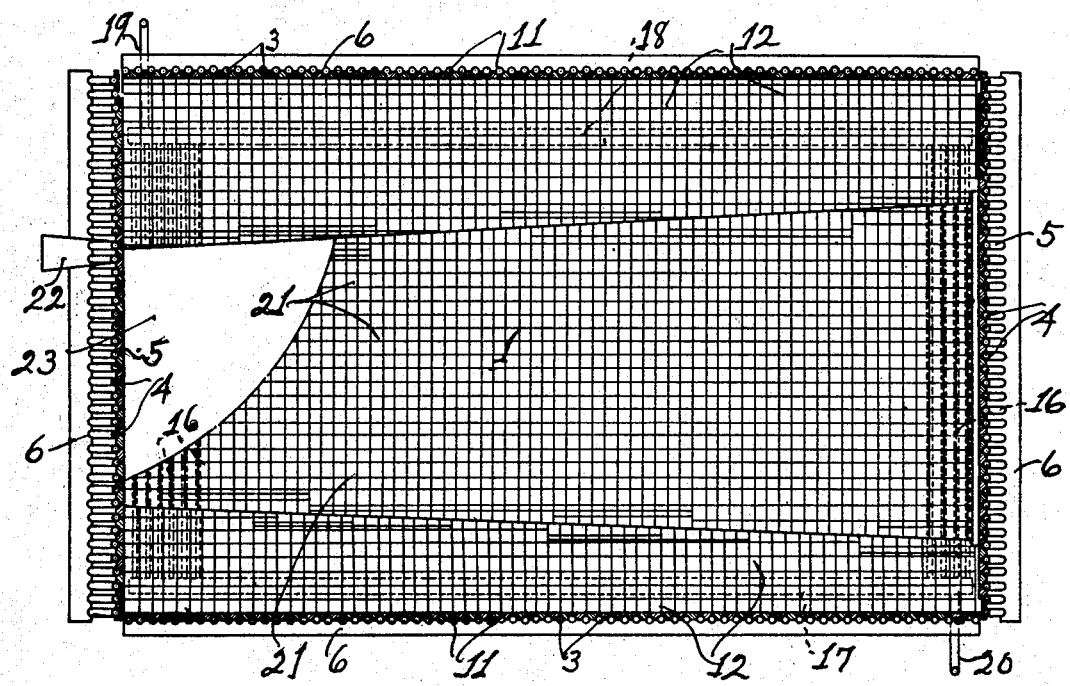
Figure 3:
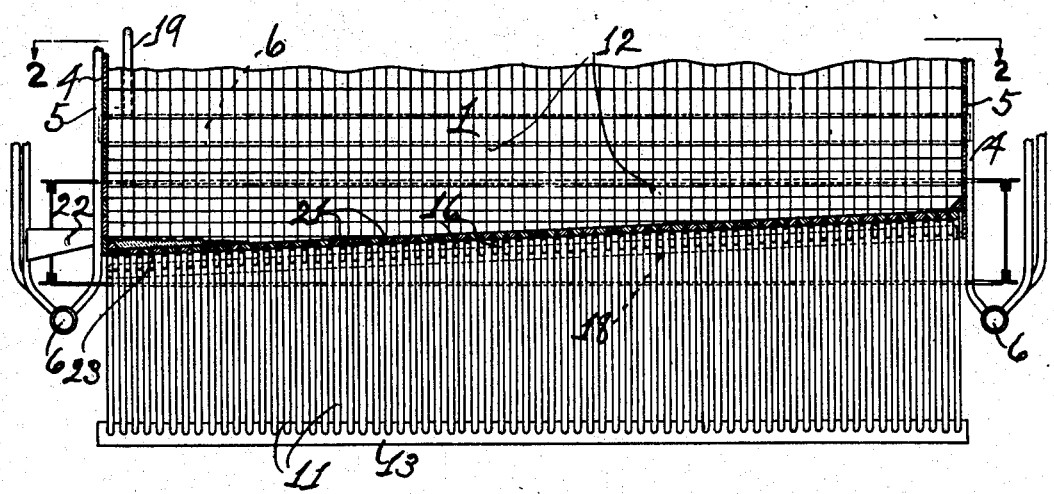
Figure 4:
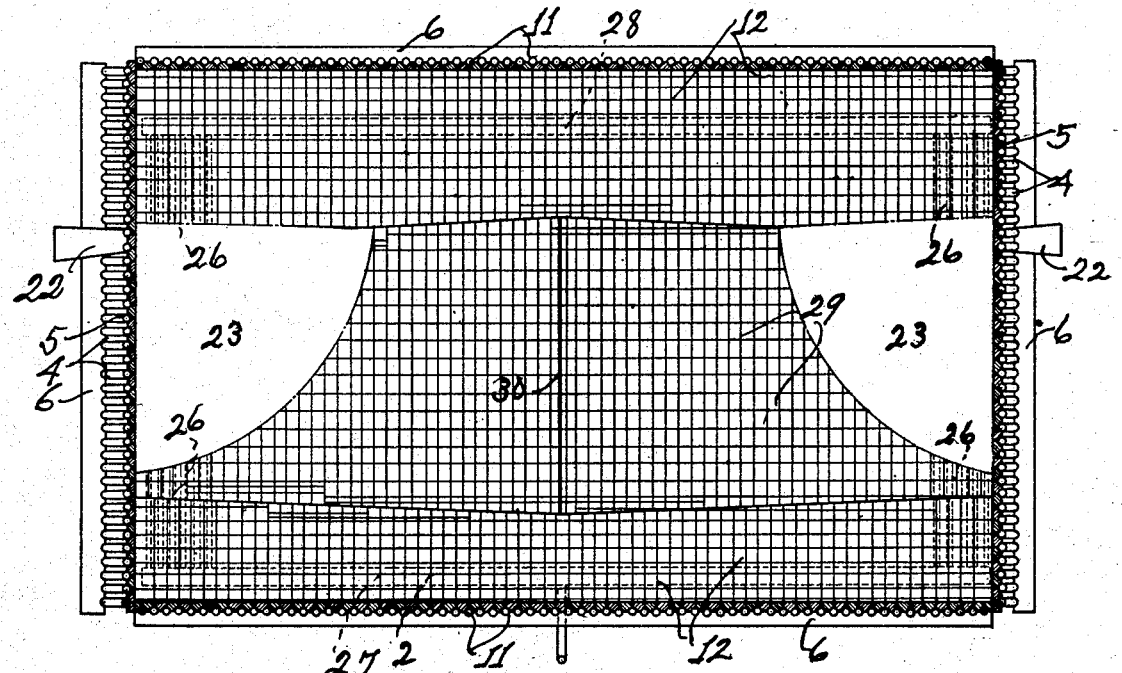
Figure 5:
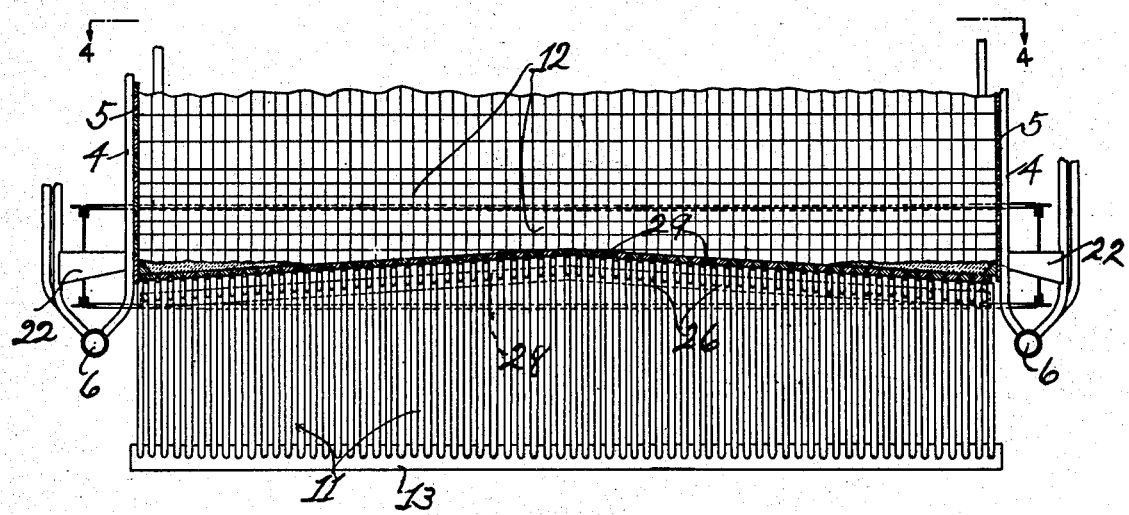

The invention will be understood from the description in connection with the drawings, in which Fig. 1 is a vertical section through a boiler illustrating the invention; Fig. 2 is a section along the line 2—2 of Fig. 3; Fig. 3 is a section along the line 3—3 of Fig. 1; Fig. 4 is a section similar to Fig. 2 taken along the line 4—4 of Fig. 5, showing a modification; and Fig. 5 is a vertical section through the floor of a furnace showing the modification.

In the drawings, reference character 1 indicates a furnace located below a boiler and provided with one or more fuel burners 2 through the front wall of the furnace.

Vertically disposed water tubes 3 are provided in the front and rear walls of the furnace and vertically disposed water tubes 4 are provided in the side walls of the furnace. The tubes 3 and 4 are lined with tile or the well-known Bailey blocks 5. The lower ends of the tubes 3 and 4 are connected to lower horizontally disposed headers 6 and the upper ends of these tubes extend outwardly and are connected to upper horizontally disposed headers 7. Downtake pipes 8 are connected to the upper headers 7 and uptake pipes 9 connect the headers 7 to the steam space of the steam and water drum 10 of the water tube boiler that is located above the furnace 1.

Rows of inwardly inclined tubes 11 extend downwardly from the headers 6 and form the inclined walls of the hopper-shaped lower portion of the furnace 1. These tubes are lined with tile or Bailey blocks 12, as indicated. The lower ends of the tubes 11 are bent outwardly and extend into the horizontal headers 13.

Tubes 14 extend from the water space of the steam and water drum 10 to the headers 13 and tubes 15 also extend to the headers 13 from the headers 15' to which the downtake tubes 8 are connected.

It will be observed that the tubes 11 and blocks 12 forming the inclined walls of the hopper-shaped lower portion are continuations of the side walls of the furnace. It is to be observed, however, that my invention in certain of its broader aspects is not limited to side walls having inclined lower portions, for other constructions may be resorted to without departing from the intended scope of my invention, for example, a construction may be used like that shown in my copending application, Serial #475,010, filed August 13, 1930, wherein the side water walls extend vertically from the top to the bottom of the combustion chamber.

A row of inclined floor tubes 16 that may be straight and parallel to each other, passes across the space between the inclined hopper walls, these tubes passing between the tubes 11 in the hopper walls. The ends of the row of tubes 16 are connected to parallel inclined headers 17 and 18, a header 17 being at a higher elevation than the header 18. A tube 19 extends from the water space of the steam and water drum 10 to the lower end of the header 18, and a tube 20 extends from the upper end of the header 17 to the steam space of the steam and water drum 10. Tile 21 are placed upon the inclined tubes 16 to provide a continuous floor for the furnace.

Water circulates from the water space of the steam and water drum 10 through the tubes 14, headers 13, hopper wall tubes 11, headers 6, furnace wall tubes 3 and 4, header 7 and tubes 9 to the steam space of the steam and water drum 10. Recirculating water also passes from the headers 7 through tubes 8, headers 15' and tubes 15 back to the headers 13. Water also circulates from the water space of the steam and water drum 10 through the tube 19 to the header 18, thence through the floor tubes 16, header 17 and tube 20 to the steam space of the steam and water drum.

The floor of the furnace is rectangularly shaped with one corner lower than the others and a slag tapping hole 22 is provided through the wall of the furnace near the lowest corner of the floor. The molten slag from the hot products of combustion collects on the floor with its greatest depth at the lower corner while the edge away from this corner thins out in a wedge shape so that after it solidifies and is subsequently heated, the expansion thereof will not exert enough horizontal thrust to cause the furnace walls to be displaced. Also the meeting of the edges of the floor with the sloping sides of the hopper-shaped bottom at an obtuse angle aids in eliminating the danger of the slag forcing the furnace walls outwardly as the edges of the slag have a tendency to move upwardly along the sloping surface of the hopper when expansion takes place.

It will be evident that the slag tapping hole 22 provides means for tapping and draining the pool of molten slag through one of the furnace walls from below the surface of the pool. Appropriate means such as an ordinary plug may be provided for closing the slag tap opening 22 so that the pool of slag may be allowed to accumulate.

In the modification shown in Figs. 4 and 5, the row of straight parallel water tubes 26 along the floor of the furnace have their upper ends connected to the upper header 27 which slopes downwardly from its middle to each end, and their lower ends are connected to the corresponding lower header 28. Tile 29 are placed upon the tubes 26 to form the continuous floor of the furnace. By this arrangement the floor of the furnace is made to slope in two directions. The black line 30 in Fig. 4 lies along the highest crest of the floor, the highest point of the floor being at the lower end of the line 30. The floor slopes toward the corners opposite the lower end of the line 30 so that when the slag collects on the floor it will assume the positions indicated by the reference character 23 with the edges of the slag away from the lowest corners thinned out along the floor.

It has been found that with water cooled floors of this type, the molten slag freezing in cracks or crevices that may be left in the floor prevents the remaining slag from leaking through and that slag-tight joints can be maintained between the edges of the floor and the walls of the furnace. When in former installations of this character a layer of slag is permitted to solidify, cracks may form in it which later become filled up with molten slag which may be permitted to freeze later, so that the slab of slag gradually grows during successive periods of cooling and exerts a very strong pressure against the walls of the furnace. This objection is overcome by the present invention. The thin edges of the slag will be crushed without displacing the walls of the furnace.

I claim:

1. In a furnace, a floor constructed to sustain a pool of molten slag, upwardly extending walls adjacent said floor, said floor sloping downward to one corner of the furnace floor between adjacent upwardly extending walls.

2. In a furnace, a hopper-shaped lower portion, water tubes in said hopper-shaped lower portion for cooling the same, a floor constructed to sustain a pool of molten slag extending across said hopper-shaped lower portion, said floor sloping to one corner of the furnace floor, water tubes in said floor for cooling the same, and means forming a slag tap opening at the lower corner of said floor, substantially as described.

3. In a furnace for burning slag forming fuel, upwardly extending side walls comprising spaced water tubes and closure elements for the spaces, a horizontally inclined furnace floor constructed to sustain a pool of molten slag and comprising at least a single row of transversely spaced water tube lengths each extending from wall to wall of said furnace, and closure elements for the spaces between said tube lengths and disposed to completely seal the said tube space, and means forming a slag tap opening in tube space of the upwardly extending side wall at the lower end of said floor and adjacent a second upwardly extending wall.

4. In a furnace for burning slag forming fuel, opposed upwardly extending side walls comprising spaced water tubes and closure elements for the spaces, a horizontally inclined furnace floor constructed to sustain a pool of molten slag and comprising at least a single row of transversely spaced water tube lengths each extending from wall to wall of said furnace, and closure elements for the spaces between said tube lengths and disposed to completely seal the said tube space, and means forming a slag tap opening in one of said side wall tube spaces adjacent a location of lowest floor elevation.

5. In a furnace for burning slag forming fuel, upwardly extending side walls comprising spaced water tubes and closure elements for the spaces, said walls defining a furnace of rectangular section, a horizontally inclined furnace floor constructed to sustain a pool of molten slag and comprising at least a single row of transversely spaced water tube lengths, each extending from wall to wall of said furnace and closure elements for the spaces between said tube lengths, said floor sloping downwardly to a corner thereof between adjacent upwardly extending walls.

6. In a furnace for burning a slag forming fuel, upwardly extending side walls comprising spaced water tubes and closure elements for the spaces, and a furnace bottom comprising a central horizontally extending portion, and margin portions inclined to said central portion, said horizontally extending portion and said margin portion each having a row of spaced water tubes and space closure means.

7. In a furnace, a floor constructed to sustain a pool of molten slag, upwardly extending walls circumscribing said floor, said floor sloping downward to one corner of the furnace at the juncture of adjacent upwardly extending walls, and means forming a slag tap opening adjacent the corner of the furnace floor toward which said floor slopes.

8. In a furnace, a floor constructed to sustain a pool of molten slag, upwardly extending walls circumscribing said floor, said floor sloping downward to one corner of the furnace at the juncture of adjacent upwardly extending walls, water tubes in said floor for cooling the same, and means forming a slag tap opening adjacent the corner of the furnace floor toward which said floor slopes.

9. In a furnace for burning slag forming fuel, the combination of upwardly extending water cooled walls defining a combustion chamber; each wall comprising a row of spaced water circulating tubes and closure means for the spaces between tubes; a furnace bottom extending across the lower portion of the combustion chamber and constructed to sustain a pool of molten slag extending over a substantial part thereof, the bottom joining the upwardly-extending walls at points so that at least the upper surfaces of the bottom which support the slag pool will be above the lowermost portions of the upwardly-extending walls to insure the provision of water cooled boundary portions for the pool;

the bottom comprising at least a single row of transversely spaced water tube lengths extending from one wall of the furnace to an opposite wall, an inlet header connected to one end of the row of tube lengths and an outlet header connected to the opposite end of the row of tube lengths, and closure means for the spaces between tube lengths and constructed to completely seal the spaces between tubes throughout their lengths so as to prevent leakage of slag therethrough.

10. In a furnace for burning a slag forming fuel, water cooled front, rear and side walls, a furnace bottom constructed to sustain a pool of molten slag extending over at least a substantial part thereof and comprising a row of transversely spaced horizontally inclined water tube lengths extending from wall to wall of said furnace, closure means for the spaces between said lengths and disposed to completely seal the said tube spaces throughout their lengths, and a burner for projecting fuel for combustion through the wall at the upper ends of the inclined tubes and directing such fuel toward the point of greatest depth of the slag pool.

11. In a furnace for burning a slag forming fuel, water cooled front, rear and side walls, a water cooled bottom constructed to sustain a pool of molten slag over at least a substantial part thereof and of greater depth at one point than another, a burner projecting fuel for combustion into the furnace through said front wall and downward and toward the rear wall, said point of greatest depth being nearer the rear wall than the front wall.

12. In a furnace for burning a slag forming fuel, water cooled front, rear and side walls, a furnace bottom constructed to sustain a pool of molten slag over at least a substantial part thereof and comprising at least a single row of transversely spaced horizontally inclined water tube lengths extending from wall to wall of said furnace, closure means for the spaces between said lengths and disposed to completely seal the said tube spaces throughout their lengths, a burner projecting fuel for combustion into the furnace through the wall at the upper ends of the inclined tubes and toward the opposite portion of the furnace, and a slag tap opening at points remote from said last mentioned wall.

RALPH M. HARDGROVE.